(12) United States Patent
Compagno et al.

(10) Patent No.: US 11,165,824 B2
(45) Date of Patent: Nov. 2, 2021

(54) TRANSPORT LAYER SECURITY EXTENSION FOR HYBRID INFORMATION CENTRIC NETWORKING

(71) Applicant: Cisco Technology, Inc., San Jose, CA (US)

(72) Inventors: Alberto Compagno, Issy les Moulineaux (FR); Luca Muscariello, Paris (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 130 days.

(21) Appl. No.: 16/656,621

(22) Filed: Oct. 18, 2019

(65) Prior Publication Data
US 2021/0120038 A1 Apr. 22, 2021

(51) Int. Cl.
*H04L 29/06* (2006.01)
*H04L 29/12* (2006.01)

(52) U.S. Cl.
CPC ........ *H04L 63/166* (2013.01); *H04L 61/2503* (2013.01); *H04L 61/6063* (2013.01); *H04L 63/0407* (2013.01); *H04L 63/0435* (2013.01); *H04L 63/126* (2013.01)

(58) Field of Classification Search
CPC ............... H04L 63/166; H04L 63/0823; H04L 29/06965; H04W 80/00; H04W 24/04; H04W 80/06
USPC ........................................................ 713/151
See application file for complete search history.

(56) References Cited

U.S. PATENT DOCUMENTS

| | | | | |
|---|---|---|---|---|
| 9,311,377 B2* | 4/2016 | Silberstein | .............. | G06F 16/27 |
| 9,426,113 B2* | 8/2016 | Mahadevan | ........ | H04L 41/0803 |
| 9,800,637 B2* | 10/2017 | Mosko | .................... | H04L 67/10 |
| 10,291,589 B1* | 5/2019 | Sharifi Mehr | .......... | H04L 67/32 |
| 10,397,809 B2* | 8/2019 | Rozhnova | ............. | H04W 24/04 |

(Continued)

OTHER PUBLICATIONS

Ascigil et al., "On-Demand Routing for Scalable Name-Based Forwarding", 2018 (Year: 2018).*

(Continued)

*Primary Examiner* — Ondrej C Vostal
(74) *Attorney, Agent, or Firm* — Edell, Shapiro & Finnan, LLC

(57) ABSTRACT

Presented herein is a solution in which a Producer that provides Transport Layer Security (TLS) over a hybrid Information Centric Network (hICN) announces two different hICN prefixes or namespaces. One hICN prefix is for performing a TLS handshake (also called a handshake prefix or handshake namespace) and another hICN prefix (also called a secure prefix or secure namespace) is to publish content in a secure, and confidential manner with a Consumer that correctly performs a TLS handshake. While the handshake prefix is public and shared by multiple Consumers, a secure prefix is uniquely assigned to a Consumer after the TLS handshake successfully terminates. Content published under the secure prefix is encrypted with the encryption key established during the TLS handshake. Names used in the secure namespace are private, meaning only the Consumer and Producer that perform the handshake can infer any information about a content by looking on the name.

20 Claims, 8 Drawing Sheets

(56) References Cited

U.S. PATENT DOCUMENTS

| | | | | |
|---|---|---|---|---|
| 2007/0035766 | A1* | 2/2007 | Yamamura | H04L 63/0428 358/1.15 |
| 2010/0257588 | A1* | 10/2010 | Urien | H04L 63/166 726/3 |
| 2012/0124375 | A1* | 5/2012 | Truskovsky | H04L 63/0823 713/168 |
| 2012/0166806 | A1* | 6/2012 | Zhang | H04L 9/0847 713/176 |
| 2017/0331800 | A1* | 11/2017 | Wood | H04L 63/0464 |
| 2018/0191740 | A1* | 7/2018 | Decenzo | H04L 63/1408 |
| 2018/0227230 | A1* | 8/2018 | Azgin | H04L 45/745 |
| 2018/0241669 | A1* | 8/2018 | Muscariello | H04L 63/10 |
| 2018/0242218 | A1* | 8/2018 | Muscariello | H04W 80/00 |
| 2019/0306282 | A1* | 10/2019 | Masputra | H04L 47/2475 |
| 2020/0259885 | A1* | 8/2020 | Alam | G06F 9/5027 |

OTHER PUBLICATIONS

Cheruvu et al., "Demystifying Internet of Things Security", 2020 (Year: 2020).*

Dictionary, "producer", 2021 (Year: 2021).*

Eddy et al., "Secure Naming and Addressing Operations for Store, Carry and Forward Networks", 2014 (Year: 2014).*

Fotiou et al., "Securing Content Sharing over ICN", 2016 (Year: 2016).*

Garcia-Luna-Aceves, "Name-Based Content Routing in Information Centric Networks Using Distance Information", 2014 (Year: 2014).*

Kurihara et al., "An Encryption-Based Access Control Framework for Content-Centric Networking", 2015 (Year: 2015).*

Li et al., "Attribute-based Access Control for ICN Naming Scheme", 2018 (Year: 2018).*

Misra et al., "Secure Content Delivery in Information-Centric Networks: Design, Implementation, and Analysis", 2013 (Year: 2013).*

Rescorla et al., "Encrypted Server Name Indication for TLS 1.3", 2019 (Year: 2019).*

Rescorla, "The Transport Layer Security (TLS) Protocol Version 1.3", Aug. 2018 (Year: 2018).*

Robyns, "Wireless Network Privacy", 2013 (Year: 2013).*

Sardara et al., "A Transport Layer and Socket API for (h)ICN: Design, Implementation and Performance Analysis", 2009 (Year: 2009).*

Wahlisch et al., "When BGP Security Meets Content Deployment: Measuring and Analysing RPKI-Protection of Websites", 2014 (Year: 2014).*

M. Mosko et al., "CCNx Key Exchange Protocol Version 1.0", draft-wood-icnrg-ccnxkeyexchange-00, icnrg, Internet-Draft, Jul. 8, 2016, 27 pages.

Sullivan, Nick, "Introducing Zero Round Trip Time Resumption (0-RTT)", https://blog.cloudflare.com/introducing-0-rtt/, Mar. 15, 2017, 5 pages.

E. Rescorla, "The Transport Layer Security (TLS) Protocol Version 1.3", Internet Engineering Task Force (IETF), Request for Comments: 8446, Aug. 2018, 160 pages.

Wikipedia, "Cryptographically Generated Address", https://en.wikipedia.org/wiki/Cryptographically_Generated_Address, Jan. 19, 2015, 4 pages.

Jon, Mihaela et al., Abstract of "Toward content-centric privacy in ICN: attribute-based encryption and routing", Published in SIGCOMM 2013, Proceedings of teh ACM SIGCOMM 2013, Aug. 12-16, 2013, 1 page.

Li, Bing et al., "Attribute-based Access Control for ICN Naming Scheme," IEEE Transactions on Dependable and Secure Computing, vol. 15, No. 2, Mar./Apr. 2018, 13 pages.

Fotiou, Nikos et al., "Securing Content Sharing over ICN", DOI: http://dx.doi.org/10.1145/2984356.2984376, ACM-ICN '16, Sep. 26-28, 2016, 10 pages.

Kurihara, Jun et al., "An Encryption-Based Access Control Framework for Content-Centric Networking", 2015 IFIP Networking Conference (IFIP Networking), May 20-22, 2015, 9 pages.

Papanis, John P. et al., Abstract of "On the use of Attribute-Based Encryption for multimedia content protection over Information-Centric Networks", Transactions on Emerging Telecommunications Technologies, vol. 25, Issue 4, Oct. 18, 2013, 1 page.

E. Rescorla et al., "Encrypted Server Name Indication for TLS 1.3", draft-ietf-tls-esni-04, tls, Jul. 8, 2019, 30 pages.

* cited by examiner

TRANSPORT LAYER SECURITY EXTENSION FOR HYBRID INFORMATION CENTRIC NETWORKING

TECHNICAL FIELD

The present disclosure relates secure network communications.

BACKGROUND

Hybrid Information Centric Networking (hICN) is a content centric communication architecture that natively supports mobility, caching, multicasting and dynamic forwarding decision by design. Currently hICN communication lacks a way for enforcing secure communication between two peers.

Transport Layer Security (TLS) is currently the standard de-facto mechanism to provide secure communication between two peers in Internet Protocol (IP) networks. TLS creates pairwise secure sessions and establishes a per-session key that is used to encrypt Layer 4 payload and provide confidentiality to upper layer protocols. Providing a peer-to-peer level of confidentiality, where only the two participants in the session can access the data is a strict requirement for many applications to protect user's privacy, such as online banking, shopping, and gambling.

DESCRIPTION OF EXAMPLE EMBODIMENTS

Overview

Figure 1:
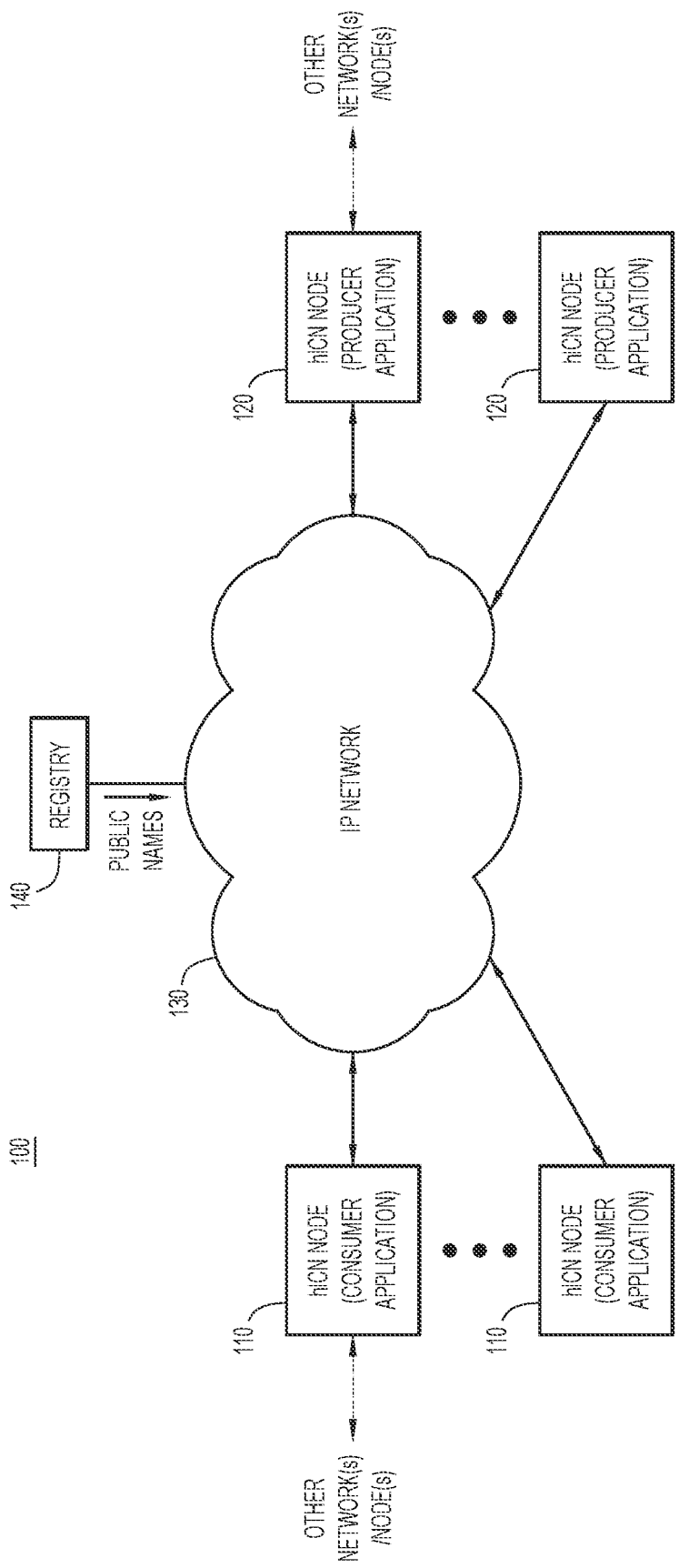
FIG. 1 is a simplified block diagram illustrating example details that can be associated with an example hybrid ICN (hICN) communication system that is configured to support use of the Transport Layer Security (TLS) protocol, according to an example embodiment.

Techniques are presented herein for enabling secure content sharing in a hybrid Information Centric Networking (hICN) communication system. In one embodiment, Consumer seeking content from a Producer, sends to the Producer a first Interest message having a payload that includes a ClientHello message compliant with Transport Layer Security (TLS) protocol. The first Interest message has a name indicating a handshake namespace and the ClientHello message includes a list of one or more name mapping algorithms that the Consumer supports to map a public name associated with the content to a private name. The Consumer receives from the Producer a first Data message having a payload that includes a ServerHello message compliant with the TLS protocol. The ServerHello message includes an indication of a selected name mapping algorithm selected by the Producer from the list of one or more name mapping algorithms included in the ClientHello message and a secure prefix associated with a secure namespace for the public name. The Consumer computes the private name for the content using the selected name mapping algorithm, the secure prefix and a shared key established by the ClientHello message and the ServerHello message exchange between the Consumer and the Producer. The Consumer sends to the Producer a second Interest message having a name indicating the private name for the content, and receives from the Producer a second Data message that includes the content.

EXAMPLE EMBODIMENTS

Presented herein are techniques to extend Transport Layer Security (TLS) Protocol, version 1.3, which works in the hICN context, and following the TLS security model, provides confidentiality between the two parties involved in a communication session.

Due to the natural group-based communication model of hICN, applicability of TLS in hICN presents the following challenges. First, TLS relies on the underlying transport layer for delivering data between the two endpoints that established the TLS session. In hICN, a Producer serves multiple consumers without the notion of which consumer issued an Interest. Assuming that multiple Consumers were able to establish a TLS session with the Producer, the Producer has no way to identify the consumer issuing the Interest and cannot select the proper TLS session to encrypt the required content. TLS does not allow to exchange one single key between more than two applications, which is needed for hICN.

Second, TLS only protects the Layer 4 payload with encryption, leaving the name of the content unchanged and insecure. If the name leaks some information about the content, protecting only the payload of Data packets might be ineffective to provide confidentiality against a network adversary.

Presented herein is a solution in which a Producer that provides TLS over hICN announces two different hICN prefixes or namespaces. One hICN prefix is for performing a TLS handshake (also called a handshake prefix or handshake namespace) and another hICN prefix (also called a secure prefix or secure namespace) is to publish content in a secure, and confidential manner with a Consumer that correctly performs a TLS handshake. While the handshake prefix is public and shared by every Consumer, a secure prefix is uniquely assigned to a Consumer for use by the Consumer after the TLS handshake successfully terminates. Every content published under the secure prefix is encrypted with the encryption key established during the TLS handshake. Moreover, names used in the secure namespace are private, meaning only the Consumer and the Producer that perform the handshake can infer any information about a content by looking on the name. The classical network adversary (from which TLS provides confidentiality) cannot infer any information about the content by knowing a name that belong to a private prefix.

Referring to first to FIG. 1, is a simplified block diagram is shown that illustrates example details of an example hybrid ICN (hICN) communication system 100 that can be used to support TLS, according to the techniques presented herein. The hICN system 100 can include one or more hICN node(s) being provisioned with a Consumer application, such as hICN node 110, one or more hICN node(s) being provisioned with a Producer application, such as hICN node 120, and an IP network 130 provisioned one or more IP routing node(s) and one or more hICN-enabled IP routing node(s), not shown in FIG. 1 for simplicity. As referred to herein, an hICN or ICN node provisioned with a Consumer application requesting content (e.g., hICN node 110 as shown in FIG. 1) can be referred to as an 'hICN consumer,' 'ICN consumer' or simply 'Consumer' and an hICN or ICN node provisioned with a Producer application providing the requested content (e.g., hICN node 110 as shown in FIG. 1) can be referred to as a 'hICN producer,' ICN producer,' or simply 'Producer'. Moreover, as shown in FIG. 1, the system 100 may include multiple Consumers 110 and multiple Producers 120. For example, a given Producer may serve the same content to multiple Consumers, via separate secure sessions, as described hereinafter.

In accordance with at least one embodiment, an hICN communication system, such as hICN communication system 100, can provide a solution for deployment of ICN inside an IP network (e.g., IP network 130), rather than over IP that preserves all features of ICN communications with at least one difference including mapping content names into IP addresses. In accordance with various embodiments, Two differences between conventional ICN architectures and hICN architectures can include: (1) naming due to mapping introduced by hICN of content names into IP addresses; and (2) forwarding and routing in which hICN architectures can enable any combination of name-based (e.g., conventional ICN forwarding and routing) and standard location-based (e.g., IP forwarding and routing) over a same IP infrastructure in accordance with various embodiments. Accordingly, hICN communication system 100 provides for the ability to preserve ICN features and advantages, while, at the same time, benefiting from exploiting an existing IP infrastructure. As referred to herein in this Specification, the terms 'semantic' and 'construct' can be used interchangeably.

In some embodiments, hICN design principles can be used to map or encode ICN content names into network layer (e.g., IP) addresses while preserving the name-prefix hierarchy. As such, hICN design principles can be used to implicitly transform regular IP routing and forwarding into their name-based counterpart, leveraging IP forwarding available in standard IP-based equipment, while not preventing the addition of ICN forwarding on top of IP forwarding as part of hICN logic provisioned for such equipment.

In at least one embodiment, several name components can be distinguished in a content name including: a routable prefix, a resource identifier, a resource name, and segmentation identifier. These name components can provide a hierarchy for identifying content from a highest level (e.g., the routable prefix) to a lowest level (e.g., the segmentation identifier). A segmentation identifier can be related to the segmentation of content items into Data packets and enforcing the unicity of content names at Data packet granularity.

Consider one illustrative example content name /ABCDE/ctao/wp/hicn/5. In practice, the content name can be encoded in a number of bits, which may be encoded, at least in part, in an IPv4 address (e.g., 32-bits) or IPv6 address (e.g., 128-bits). In this particular example: the routable prefix is /ABCDE, the resource identifier is /ctao/wp, the resource name is /hicn, and the segment identifier is /5. In various embodiments, the hierarchical naming scheme can vary depending on applications, needs, implementations, or the like.

In general, a routable prefix can represent a routable identifier that can be used to find one or multiple resources. The resource identifier can represent the path within which a set of resources are grouped (e.g., a folder name, a directory, etc.). The resource name can represent an identifier of a particular resource within a set (e.g., a specific file in a folder or directory). The segment identifier can be used to identify the resource or parts of the resource. Segmentation of a resource can vary, for example, based on how a producer segments its resources. In some embodiments, the segment identifier can be a sequence number, a time pointer, or a byte offset. In general, components of the content name together can identify the content of interest. The ICN content name can be mapped to IP addresses in different ways. As explained further below, segmentation of a resource can be relevant to the private namespace such that there needs to be sufficient IP addresses available to map all of the public names to private names.

Private hICN names are constructed starting from public hICN names. That is, a public name is a content name that is known by everyone (e.g., through querying a Domain Name System (DNS) server). In one example, and as shown in FIG. 1, the system 100 may include a registry 140. The registry 140 stores information about public names associated with content available from Producers 120 and makes those public names available to Consumers 110. Producers 120 advertise content that they are offering under public hICN names (public names) via the registry 140. For example, a Producer obtains a list of prefixes for an HTTP server, and registers those prefixes with the registry 140. Thus, a Consumer may request and obtain from the Registry 140 the public name associated with content made available from a Producer that has registered its content with the registry 140. In another embodiment, the public names are distributed by applications without imposing any particular access restriction. There may be other mechanisms now known or hereinafter developed by which Consumers retrieve the public name of the content published by a Producer.

Public Name to Private Name Mapping

A private name is obtained by encrypting the public name with a shared key between a Consumer and a Producer. The result of the encryption is appended to a secure prefix to create the private name, for example, /secure_prefix/Encryption(public_name). The secure prefix is used to generate private names that are meant only for a Consumer with whom a Producer is having secure communication. This protects/secures any information that could be derived from a name.

Because in hICN, names are IP addresses, it is useful to guarantee that the private name is a valid IP address. In this case, the secure prefix is an IP prefix that contains enough IP addresses to map all the content that a given Producer is to publish for a Consumer. Thus, for one public name there is at least one IP address that belongs to the secure prefix. The mapping between public names and private names is achieved by assigning an IP address in the secure prefix to each public name. Then, for each IP address, the secure prefix is excluded from the IP address, and a format preserving mapping algorithm (e.g., encryption function) is applied to the remaining part of IP address. The entire IP address is constructed by prepending the secure prefix to the result of the encryption operation.

Figure 2:
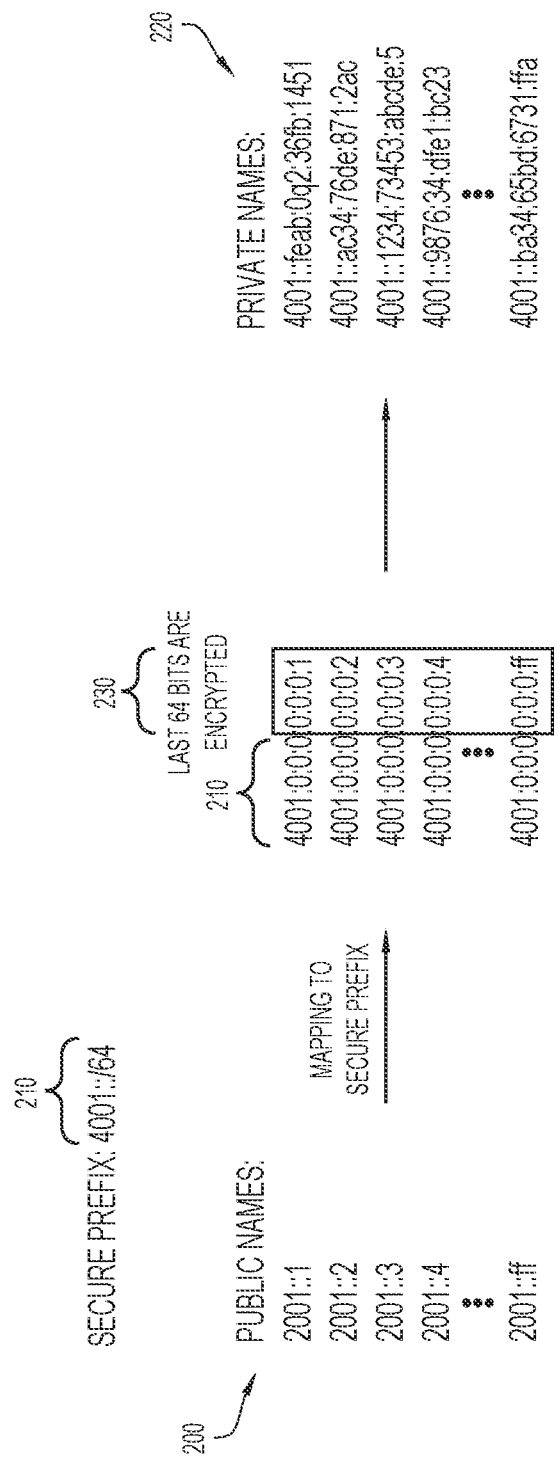
FIG. 2 is a diagram depicting how private names are generated from public names to define a secure namespace for use in an hICN system, according to an example embodiment.

FIG. 2 illustrates an example of this mapping/conversion mechanism between public names and private names. In this example, public names for content offered by a given Producer are 2001::1 through 2001:ff, as shown at 200. The secure prefix is, for example, 4001::/64, as shown at 210. To generate an IP address 220 for a private name corresponding to a public name, the secure prefix 210 is excluded from the IP address, and an encryption function is applied to the remaining part 230 of the IP address, using the shared key negotiated between the Consumer and Producer, as part of the TLS handshake.

For example, an IP address in the secure prefix 4001::/64 is assigned to the public name 2001::1. Then, an encryption function, using the shared key, is applied to 0:0:0:1, and the secure prefix 4001:: is applied to the result of that encryption operation to produce 4001::feab:0q2:36fb:1451. The same is performed for each of the public names 2001::2 through 2001::ff.

In the case of an IPv6 address, the last 64 bits is be used to encrypt the secure part. If an IPv4 address is sued, then the last 16 bits are used.

As described further below, the Consumer proposes to the Producer a list of one or more mapping algorithms (encryption functions) that the Consumer supports in order to generate the private names from public names. The encryption functions may include various cryptographic algorithms such as Crypto1, SHA2, etc.

The above mechanism to obtain private names from public names is only one example. The following techniques for the TLS handshake can be used with any mechanism that guarantees private names between a Consumer and a Producer.

Producer Authentication Handshake

Figure 3:
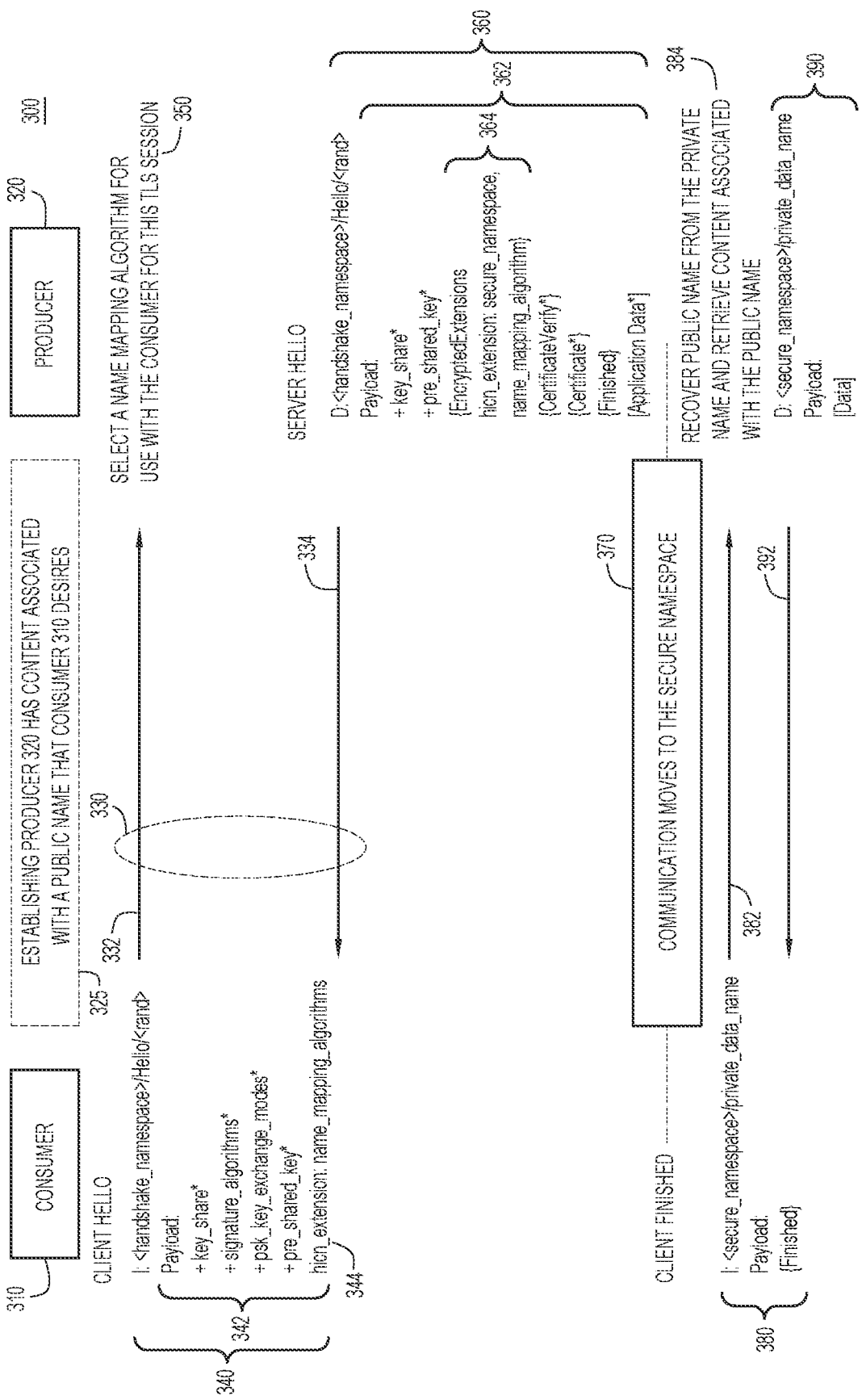
FIG. 3 is a sequence flow diagram depicting the exchange of messages between a Consumer and a Producer for using TLS protocol security for a Producer Authenticated Handshake, according to an example embodiment.

Reference is now made to FIG. 3. Reference is also made to FIG. 1 in connection with the description of FIG. 3.

FIG. 3 shows a sequence flow 300 between a Consumer 310 and a Producer 320 for a Producer Authenticated Handshake, according to an example embodiment. The sequence flow 300 represents a modification to the TLS 1.3 handshake, where only the Producer 320 is authenticated from the Consumer 310 (Producer Authentication).

As shown at 325 in FIG. 3, the sequence flow 300 presupposes that, through various hICN techniques now known or hereinafter developed, it has been established that the Producer 320 has the content associated with a public name that the Consumer 310 desires. The Consumer 310 learned of this public name through, for example, the Registry 140 that publishes public names associated with content available in the hICN system 100.

The sequence flow 300 includes a handshake that follows the regular full handshake of TLS 1.3. This TLS handshake, shown at 330, consists of a first message that the Consumer 310 sends, at 332, to the Producer 320, and a second message that the Producer 320 sends, at 334, back to the Consumer 310.

The first message is a ClientHello message that is mapped into an Interest message 340. Specifically, data for a TLS ClientHello message 342 is contained in the payload of the Interest message 340. The name of the Interest message 340 is <handshake_namespace>/Hello/<rand> to indicate that it includes a ClientHello message 342 to initiate a TLS handshake 330. The "<rand>" in the name of the Interest message 340 indicates a random number that allows for reducing the probability of interest aggregation between two Consumers that start a TLS handshake at the same time with the same Producer. The name <handshake_namespace> indicates the public handshake prefix.

The ClientHello message 342 includes elements defined by TLS 1.3, including key_share*, signature_algorithms*, psk_key_exchange_modes* and a pre_shared_key*, as well as an extension to the ClientHello message, called an hICN extension, shown at 344. The hICN extension 344 includes an element called name_mapping_algorithms that defines a list of one or more mapping algorithms that the Consumer 310 supports to perform the public name to private name conversion, such as in accordance with the mechanism described above in connection with FIG. 2. Thus, the hICN extension 344 informs the Producer 320 that this is a TLS handshake performed over hICN. Again, the Consumer 310 adds the hICN extension 344 that provides a list of one or more supported algorithms among which the Producer 320 will choose to generate the secure namespace by which a public name is converted to a private name. The list of algorithms may be ordered according to the Consumer's preference, the first being the most preferred the last is the least preferred.

When the Producer 320 receives the Interest message 340, it reads the name of the Interest message 340 to determine that the Consumer 310 desires to initiate a TLS handshake with the TLS ClientHello message, and reads the fields of the ClientHello message 342 to detect the hICN extension 344 that contains the list of one or more mapping algorithms that the Consumer 310 supports. At 350, the Producer 320 selects among the list of one or more mapping algorithms to use for generating a secure name space, i.e., private name corresponding to the public name for the content that the Consumer desires from the Producer. If there is only one mapping algorithm indicated in the hICN extension 344, then by default the Producer uses that algorithm. If there are more than one mapping algorithms indicated in the hICN extension 344, then the Producer 320 selects one of those algorithms. In one embodiment, the criterion/criteria that the Producer 320 uses for selecting among a plurality of mapping algorithms reflects the Consumer's preference: it iterates through the list provided by the Consumer, from the most preferred to the least preferred and it chooses the first algorithm that it supports.

After the Producer 320 has selected the mapping algorithm (encryption function) to use for converting a public name for the content to a private name, the Producer 320 generates the second message of the TLS handshake 330, the Data message 360. The Data message 360 corresponds to the TLS 1.3 ServerHello message that is enhanced with encrypted hICN extensions, as discussed in further detail below. Thus, the Producer 320 includes in the payload of the Data message 360 a ServerHello message 362 according to TLS 1.3 that includes key_share*, pre-shared_key*, {CertificateVerify*}, {Certificate*}, {Finished}, and further includes in a list of encrypted extensions of the ServerHello message 362, an hICN extension 364 that contains the secure namespace (secure prefix) the Consumer 310 is to use to request content, and the selected algorithm to generate private name(s) for the content. The Producer 320 determines the secure prefix to use for generating the private names in a manner such as that described above in connection with FIG. 2. Hereinafter, the Producer 320 publishes content to the Consumer 310 under the secure namespace and each content will be encrypted with the key established in the TLS handshake 330. Moreover, since the secure namespace (secure prefix) and the selected mapping algorithm are included in the encrypted fields of the ServerHello message 362, this information is secure. The Data message 360 is sent back to the Consumer 310 as shown at 334 in FIG. 3. Moreover, as shown at 370 in FIG. 3, further communication between the Consumer 310 and the Producer 320 moves to the secure namespace.

Once communication moves to the secure namespace, the next (third) message in the sequence flow 300 is an Interest message 380 that the Consumer 310 sends, at 382, to the Producer 320 to retrieve the desired content in a secure manner. The name of the Interest message 380 is a private name constructed as explained above in connection with FIG. 2, using the secure prefix, the selected mapping algorithm provided by the Producer 320 in the Data message 360, and the shared key negotiated as part of the TLS handshake 330. That is, the name of Interest message 380 is <secure_namespace>/private_data_name, where private_data_name is the private name derived as explained above in connection with FIG. 2. The payload of the Interest message 380 contains the "Finished" record of TLS 1.3 that informs the Producer 320 that the TLS handshake 330 completed successfully and was not tampered.

In response to receiving the Interest message 380, at 384, the Producer 320 recovers the public name from the private name, and retrieves the content associated with the public name. Since the Producer 320 selected the mapping algorithm and knows the secure prefix and the shared key, the Producer can recover the associated public name from the private name. At 390, the Producer 320 generates a Data message 390 having a name <secure_namespace>/private_data_name, and includes the content associated with the public name derived at operation 384, as [Data] in the payload of the Data message 390 sent to Consumer 310 at 392.

Mutual Authentication Handshake

Figure 4:
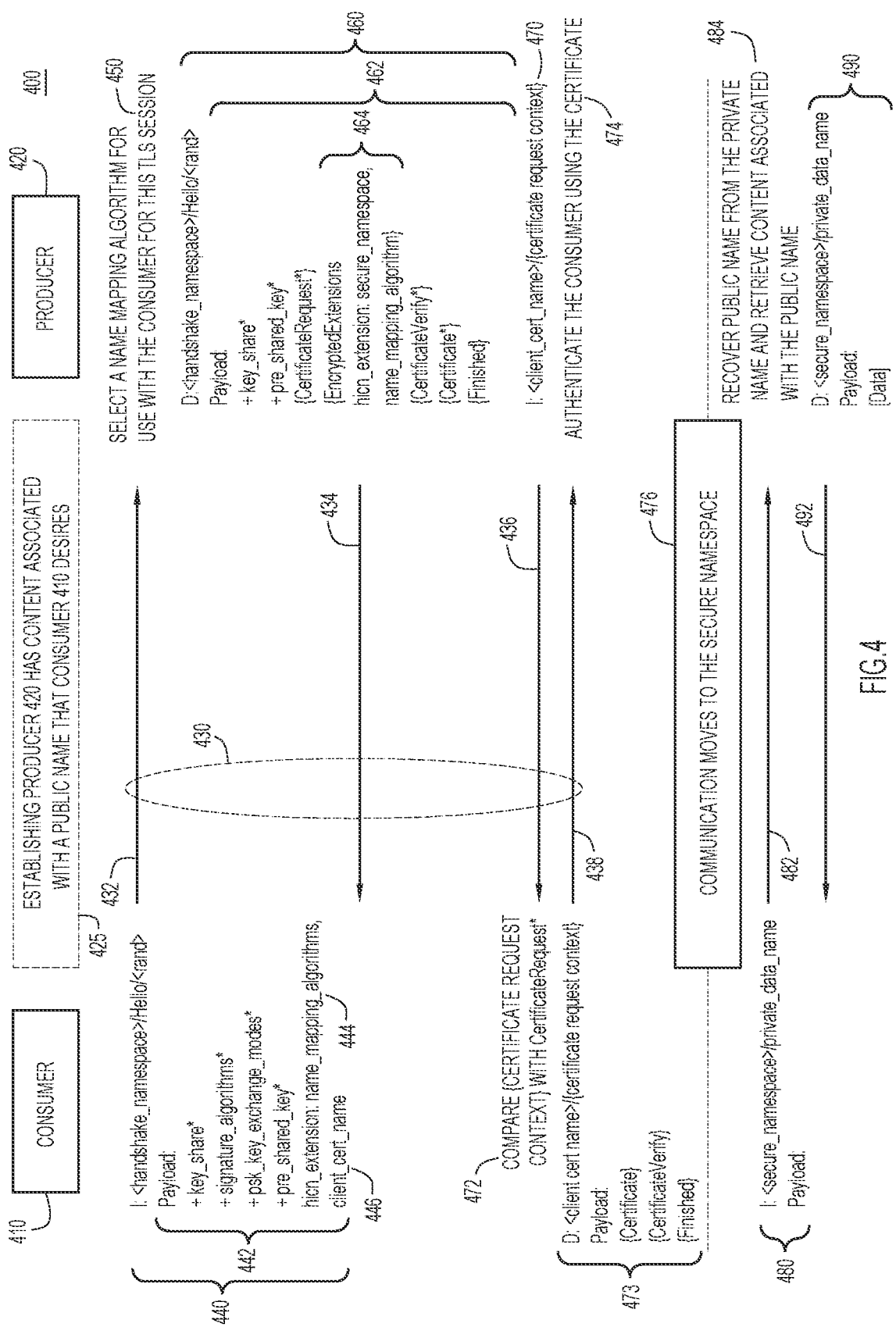
FIG. 4 is a sequence flow diagram depicting the exchange of messages between a Consumer and a Producer for using TLS protocol security for a Mutual Authenticated Handshake, according to an example embodiment.

Reference is now made to FIG. 4. Reference is also made to FIG. 1 in connection with the description of FIG. 4.

FIG. 4 shows a sequence flow 400 between a Consumer 410 and a Producer 420 for a Mutual Authentication Handshake, according to an example embodiment. As shown at 425 in FIG. 4, the sequence flow 400 presupposes that, through various hICN techniques, it has been established that the Producer 420 has the content associated with a public name that the Consumer 410 desires. The Consumer 410 learned of this public name through, for example, the Registry 140 that publishes public names associated with content available in the hICN system 100.

The sequence flow 400 includes a handshake 430. The handshake 430 includes a first exchange of messages shown at 432 and 434, and a second exchange of messages shown at 436 and 438. The first exchange of messages shown 432 and 434 is similar to the handshake 330 shown in FIG. 3, with one addition, as described below.

The first message is a ClientHello message that is mapped into an Interest message 440. Data for a TLS ClientHello message 442 is stored in the payload of the Interest message 440. The name of the Interest message 440 is <handshake_namespace>/Hello/<rand> to indicate that it includes a ClientHello message 442.

The ClientHello message 442 includes elements defined by TLS 1.3, including key_share*, signature_algorithms*, psk_key_exchange_modes* and a pre_shared_key*, as well as an extension to the ClientHello message, called an hICN extension shown at 444. The hICN extension 444 includes the element name_mapping_algorithms that defines a list of one or more mapping algorithms that the Consumer 410 supports to perform the public name to private name conversion, similar to the Interest message 340 described above in connection with FIG. 3.

In the Mutual Authenticated Handshake sequence flow 400, the Consumer 410 adds in the hICN extension an hICN prefix client_cert_name shown at 446. The Producer 420 will use client_cert_name to retrieve the certificate of Consumer 410 for its authentication. At 432, the Consumer 410 sends the Interest message 440 to the Producer 420.

When the Producer 420 receives the Interest message 440, it reads the name of the Interest message 440 to determine that the Consumer 410 desires to initiate a TLS handshake with a TLS ClientHello message, and reads the fields of the ClientHello message 442 to detect the hICN extension 444 that contains the list of one or more mapping algorithms that the Consumer 310 supports and the hICN prefix for the client certificate, client_cert_name 446. At 450, the Producer 420 selects among the list of one or more mapping algorithms to use for generating a secure namespace, i.e., private name corresponding to the public name for the content that the Consumer desires from the Producer, as described above.

The next (second) message is a Data message 460 that satisfies the Interest message 440. The Data message 460 contains the TLS ServerHello 462 message in the payload of the Data message 460. Like Data message 360 shown in FIG. 3, in the Data message 460, the Producer 420 adds the hICN extension 464 containing the secure prefix the Consumer 410 is to use to generate private names to request content, and the selected algorithm to generate the private name(s) for the content. The Data message 460 is sent back to the Consumer 410 as shown at 434 in FIG. 4. Furthermore, the Producer includes a random byte in the CertificateRequest* element of the ServerHello message 462, for use by the Consumer 410, as described further below.

The message exchange 436 and 438 that is part of the handshake 430 is now described. The next (third) message 470 is an Interest message the Producer 420 sends to the Consumer 410 to request the certificate of the Consumer 410 in order to perform the authentication. The name of the Interest message 470, <client_cert_name/{certificate request context}, is composed using the hICN prefix, client_cert_name, contained in the ClientHello message 442 followed by the certificate request context, {certificate request context}, presented in the ServerHello message 462.

The {certificate request context} in the Interest message 470 is a random byte/number that the Producer 420 generates and includes as part of the CertificateRequest* element included in the ServerHello message 462, and is unique per each handshake and is encrypted using the handshake key, as defined in TLS 1.3. On receiving the Interest message 470, at 472, the Consumer 410 compares the random byte of the certificate request context in the name of the Interest message 470 with the random byte of the CertificateRequest* element contained in the ServerHello message 462. If the two values are the same, the Consumer 410 replies with a Data message 474 that includes its certificate, {Certificate} and the {CertificateVerify} as specified in TLS 1.3, and the {Finished} element to inform the Producer 420 that the handshake 430 completely successfully. At 474, the Producer authenticates the Consumer using the {Certificate}. At this point, the handshake 430 is concluded on both sides and the Consumer 410 can request the content using the private names in the secure namespace, as shown at 476.

In other words, the Consumer 410 stores the random byte included in the ServerHello message 462. Then, the Consumer 410 receives the Interest message 470 that has the {certificate request context} random byte encrypted with the handshake key, which the Consumer is able to decrypt using the handshake key. If the random byte included in the ServerHello message 462 matches the random byte in the Interest message 470 received from the Producer 420, then the Consumer 410 can be authenticated by the Producer 420 via the {Certificate} sent to the Producer 420 by the Consumer 410.

Like in the sequence flow 300 of FIG. 3, once communication moves to the secure namespace, the next (third) message in the sequence flow 400 is an Interest message 480 that the Consumer 410 sends, at 482, to the Producer 420 to retrieve the desired content in a secure manner. The name of the Interest message 480 is a private name constructed as explained above in connection with FIG. 2, using the secure prefix, the selected mapping algorithm provided by the Producer 420 in the Data message 460, and the shared key negotiated as part of the TLS handshake 430. That is, the name of Interest message 480 is <secure_namespace>/private_data_name, where private_data_name is the private name derived as explained above in connection with FIG. 2.

In response to receiving the Interest message 480, at 484, the Producer 420 recovers the public name from the private name, and retrieves the content associated with the public name. Since the Producer 420 selected the mapping algorithm and knows the secure prefix and the shared key, the Producer can recover the associated public name from the private name. At 490, the Producer 420 generates a Data message 490 having a name <secure_namespace>/private_data_name, and includes the content associated with the public name derived at operation 484, as [Data] in the payload of the Data message 490 sent to the Consumer 410 at 492.

The difference between the sequence flow 400 of FIG. 4 and the sequence flow of FIG. 3 is that in the sequence flow of FIG. 4, the Consumer 410 informs the Producer 420 of the name for obtaining the Consumer's certificate to use to authenticate the Consumer.

In the Mutual Authentication Handshake shown in FIG. 4, the Producer generates an Interest that is based on the ClientHello message in order to retrieve the client certificate for the Consumer. This is because hICN addresses content and not a host. Interests do not carry the Consumer IP address as in the regular IP network communication. Therefore, the Consumer needs to pass the name of its certificate to let the Producer retrieve it and authenticate the Consumer.

Zero Round Trip Time Resumption (0-RTT) in hICN can be exploited by the Consumer in case the Consumer needs to send some early-data to the Producer. As in TLS 1.3, the first data message contains the data encrypted with a pre-shared key. This may be considered as 0-RTT because there is no initial RTT due to any key exchange protocol. TLS alert messages are carried in the Interest message payload or Data message payload depending on the detecting party. If a Consumer detects an error, the Consumer will send an Interest carrying an alert message. If the Producer detects an error, the Producer will reply to the next Interest with a Data message carrying the error message.

Using two different namespaces for the handshake and for the content retrieval facilitates the use of TLS working in hICN, according to the embodiments presented herein. This assumes an attacker could have complete control of the network as in IETF RFC 8446. If the attacker intercept packets during the handshake, the attacker cannot infer the content that the Consumer is requesting once the TLS session has been established because there is no correlation between the handshake prefix and the private names. Furthermore, using a per-consumer secure prefix avoids aggregation with Interests generated by other consumers as well as avoids a Consumer from retrieving a cached content that does not belong to that Consumer's TLS session.

Figure 5A:
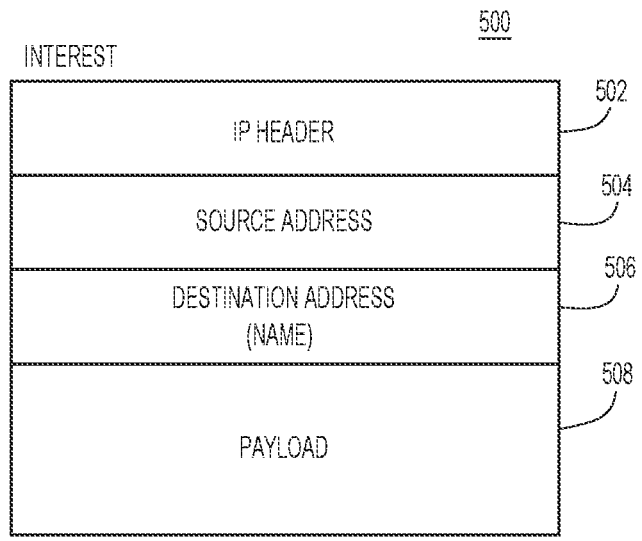
FIG. 5A is a diagram showing an example of an Interest message sent by a Consumer, according to an example embodiment.
Figure 5B:
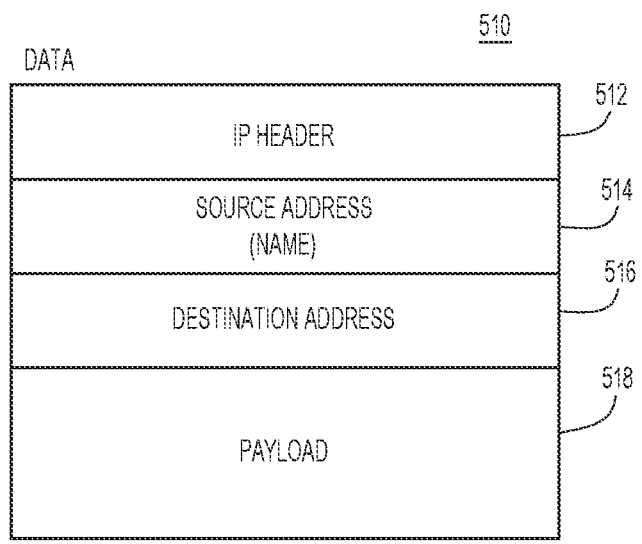
FIG. 5B is a diagram showing an example of a Data message sent by a Producer, according to an example embodiment.

Reference is now made to FIGS. 5A and 5B. FIG. 5A illustrates a simplified diagram of an Interest packet/message 500 that a Consumer sends in accordance with the sequence flows presented in FIGS. 3 and 4. The Interest 500 includes an IP header 502, a source IP address 504, a destination IP address 506 and a Payload 508. The destination IP address 506 specifies a name, and which name it specifies depends on whether the Interest 500 is part of the handshake namespace (handshake 330 of FIG. 3 or 430 of FIG. 4), or is part of the secure namespace in FIG. 3 or FIG. 4. When the Interest 500 is part of the handshake namespace, the destination address 506 specifies the handshake name, as, for example, <handshake namespace/Hello/<rand> and when the Interest 500 is part of the secure namespace, then the destination address 506 specifies the secure name, as for example, <secure_namespace>/private_data_name. Moreover, the payload 508 of the Interest 500 may include the ClientHello message (with the hICN extension) when the Interest 500 is part of the handshake 330 or 430, and may include the {Finished} element when it is part of the secure namespace.

FIG. 5B shows a simplified diagram of a Data packet/message 510 that a Producer sends in accordance with the sequence flows presented in FIGS. 3 and 4. The Data 510 includes an IP header 512, a source address 514, a destination address 516 and a payload 518. The destination address 516 specifies a namespace, and which namespace it specifies depends on whether the Data 510 is part of the handshake namespace (handshake 330 of FIG. 3 or 430 of FIG. 4), or is part of the secure namespace in FIG. 3 or FIG. 4. When the Data 510 is part of the handshake namespace, the destination address 516 specifies the handshake namespace, as, for example, <handshake namespace/Hello/<rand> and when the Data 510 is part of the secure namespace, then the destination address 516 specifies the secure namespace, as for example, <secure_namespace>/private_data_name. Moreover, the payload 518 of the Data 510 may include the ServerHello message (with the hICN extension) when the Data 510 is part of the handshake 330 or 430, and may include the [Data] for the content when it is part of the secure namespace.

It is noted that in the sequence flow of FIG. 4, the Producer 420 also sends an Interest message to the Consumer and the Consumer replies with a Data message to the Producer. One with ordinary skill in the art will appreciate the format that those messages will take in view of the description of FIGS. 3 and 4 and the diagrams of FIGS. 5A and 5B.

Figure 6:
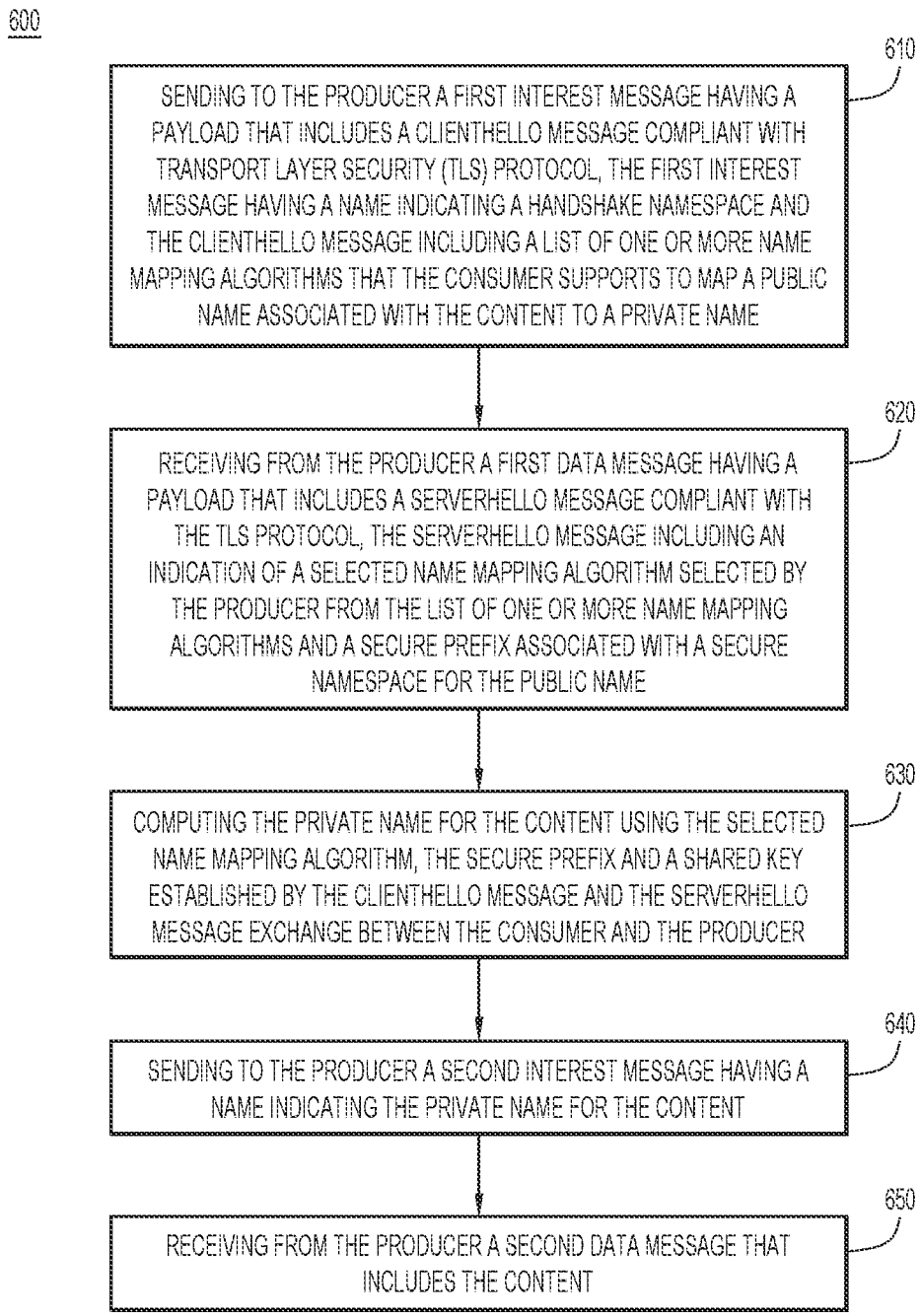
FIG. 6 is a flow chart depicting a method performed by a Consumer, according to an example embodiment.

Reference is now made to FIG. 6. FIG. 6 illustrates a flow chart for a method 600 performed by a Consumer, according to the embodiments presented herein. Thus, method 600 is performed by a Consumer seeking content from a Producer in a hICN. At 610, the Consumer sends to the Producer a first Interest message having a payload that includes a ClientHello message compliant with Transport Layer Security (TLS) protocol. The first Interest message has a name indicating a handshake namespace, and the ClientHello message includes a list of one or more name mapping algorithms that the Consumer supports to map a public name associated with the content to a private name.

At 620, the Consumer receives from the Producer a first Data message having a payload that includes a ServerHello message compliant with the TLS protocol. The ServerHello message includes an indication of a selected name mapping algorithm selected by the Producer from the list of one or more name mapping algorithms included in the ClientHello message and a secure prefix associated with a secure namespace for the public name.

At 630, the Consumer computes the private name for the content using the selected name mapping algorithm, the secure prefix and a shared key established by the ClientHello message and the ServerHello message exchange between the Consumer and the Producer.

At 640, the Consumer sends to the Producer a second Interest message having a name indicating the private name for the content. At 650, the Consumer receives from the Producer a second Data message that includes the content.

As explained above in connection with FIG. 3, the list of one or more name mapping algorithms is included in an extension to the ClientHello message compliant with the TLS protocol. Moreover, the secure prefix and the selected name mapping algorithm are included in one or more encrypted extensions to the ServerHello message compliant with the TLS protocol. In one example, the list of one or more name mapping algorithms includes one or more encryption algorithms. Furthermore, the secure prefix is an Internet Protocol (IP) prefix that contains a number of IP addresses to map content associated with a given public name. Thus, a mapping between public names and private names is achieved by assigning an IP address in the secure prefix to each public name.

The operation 630 of computing the private name thus involves: excluding the secure prefix and applying the selected mapping algorithm to a remaining part of the IP address; and reconstructing the IP address for the private name by prepending the secure prefix to a result of applying the selected mapping algorithm to the remaining part of the IP address.

As depicted in FIGS. 3 and 4, the ClientHello message and the ServerHello message are part of a TLS handshake, and the second Interest message includes in a payload an indication that the TLS handshake is successfully completed.

Further, as described above in connection with FIG. 4, the ClientHello message included in the first Interest message further includes a client certificate name for use by the Producer to retrieve a client certificate for the Consumer, and the ServerHello message (and in particular the CertificateRequest* element) includes a random byte generated by the Producer. The method 600 further includes: receiving from the Producer an Interest message having a name that includes a certificate request context, wherein the certificate request context is the random byte generated by the Producer and encrypted using the shared key; comparing the random byte obtained from the certificate request context of the Interest message received from the Producer with the random byte obtained from the ServerHello message to determine whether there is a match; and if the match is determined, sending to the Producer a Data message that includes a certificate for the Consumer and a payload that includes an indication that the TLS handshake successfully completed.

As described above in connection with FIG. 4, the random byte generated by the Producer and used as the {certificate request context} is unique per handshake between the Producer and the Consumer and is encrypted using a key (the shared key) obtained in accordance with the TLS protocol.

Figure 7:
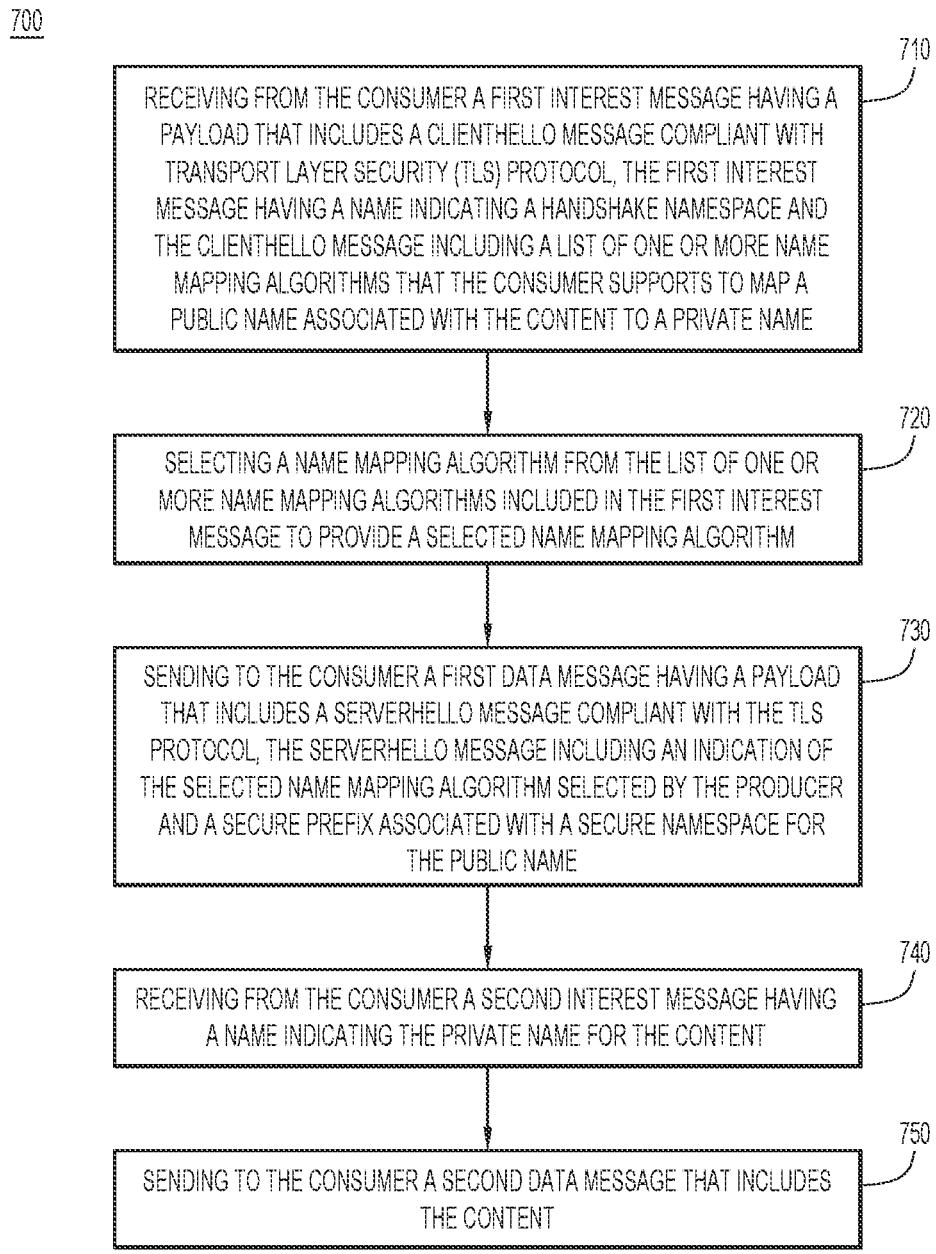
FIG. 7 is a flow chart depicting a method performed by a Producer, according to an example embodiment.

Reference is now made to FIG. 7, which shows a flow chart for a method 700 performed by a Producer, according to the embodiments presented herein. The method 700 is performed by a Producer that is to provide content to a Consumer in a hICN. At 710, the Producer receives from the Consumer a first Interest message having a payload that includes a ClientHello message compliant with Transport Layer Security (TLS) protocol. The first Interest message has a name indicating a handshake namespace and the ClientHello message includes a list of one or more name mapping algorithms that the Consumer supports to map a public name associated with the content to a private name. At 720, the Producer selects a name mapping algorithm from the list of one or more name mapping algorithms included in the first Interest message to provide a selected name mapping algorithm. At 730, the Producer sends to the Consumer a first Data message having a payload that includes a ServerHello message compliant with the TLS protocol. The ServerHello message includes an indication of the selected name mapping algorithm and a secure prefix associated with a secure namespace for the public name. At 740, the Producer receives from the Consumer a second Interest message having a name indicating the private name for the content. At 750, the Producer sends to the Consumer a second Data message that includes the content.

The list of one or more name mapping algorithms may be included in an extension to the ClientHello message compliant with the TLS protocol, and the secure prefix and selected name mapping algorithm are included in one or more encrypted extensions to the ServerHello message compliant with the TLS protocol. Moreover, the list of one or more name mapping algorithms includes one or more encryption algorithms, and wherein secure prefix is an Internet Protocol (IP) prefix that contains a number of IP addresses to map content associated with a given public name. A mapping between public names and private names may be achieved by assigning an IP address in the secure prefix to each public name, and wherein the private name is computed by excluding the secure prefix and applying the selected mapping algorithm to a remaining part of the IP address; and reconstructing the IP address for the private name by prepending the secure prefix to a result of applying the selected mapping algorithm.

As explained above, the ClientHello message and the ServerHello message are part of a TLS handshake, and the second Interest message includes in a payload an indication that the TLS handshake is successfully completed.

As described above in connection with FIG. 4, the ClientHello message included in the first Interest message further includes a client certificate name for use by the Producer to retrieve a client certificate for the Consumer. The method 700 further includes: generating a random byte that is included in the ServerHello message of the first Data message; sending to the Consumer an Interest message having a name that includes a certificate request context, wherein the certificate request context is the random byte generated by the Producer and encrypted using a shared key established between the Consumer and Producer as part of the TLS handshake; and receiving from the Consumer a Data message that includes a certificate for the Consumer and a payload that includes an indication that the TLS handshake successfully completely when the Consumer compares random byte obtained from the certificate request context of the Interest message received from the Producer with the random byte obtained from the ServerHello message and determines there is a match. The random byte may be unique per handshake between the Producer and the Consumer, and is encrypted using a key obtained in accordance with the TLS protocol The embodiments presented herein provide TLS security features for hICN. There are numerous benefits of these embodiments over existing schemes. First, compared to previous key exchange proposed in ICN (i.e., CCNxKE), the present embodiments approach involve one round trip time to perform the handshake and provide confidentiality to the hICN name as well. Second, compared to TLS over Transmission Control Protocol (TCP), the present embodiments provide seamless consumer mobility as a secure session is identified by a secure name prefix. Even if the Consumer moves and its IP address changes, the secure name prefix will still be valid and used to retrieve the content in a confidential manner. Third, compared to Google Quick UDP Internet Connections (GQUIC), the present embodiments are generic and support every application layer protocol while GQUIC has been designed and used only with the HyperText Transfer Protocol (HTTP). Furthermore, with respect to QUIC+TLS, the present embodiments do not require any extra header between Layer 4 (TCP or UDP) and TLS. Moreover, these techniques allow the transport protocol to exploit in-network caching to recover from network losses.

Again, a goal of the techniques presented herein is to provide confidentiality of the data exchanged between a Consumer and Producer. TLS provides confidentiality of the application data by encrypting the data payload, and in the regular IP communication this is sufficient because neither the IP header nor the TCP header carry any information about the data itself. In hICN, the IP address (destination address in case of an Interest and source address in case of a Data) directly refers to data and unless a mechanism is applied, like the mechanisms of the present embodiments, the name is public and it leaks information about the content. For example, consider a public webpage that is addressed by a public hICN name (e.g., the ipv6 address 2001::1), known by many users (potentially everyone, including a network adversary). If the public web page is retrieved using hICN+TLS and the public hICN name is not masked, the public hICN name itself leaks information about the content of the payload, even if the payload is encrypted. The mechanisms presented herein assign hICN names, called private names herein, to data that are known only by the participant of the secure session.

As described above, a secure namespace is an IP address prefix that is uniquely used by a Consumer-Producer pair to derive private hICN names used to name content. These private names guarantee that the association between hICN name <-> unencrypted data is known only by the Producer and the Consumer that established the secure session. Using an hICN name that is known only by the Consumer and Producer in the session prevents information leakage about the content in the name.

Figure 8:
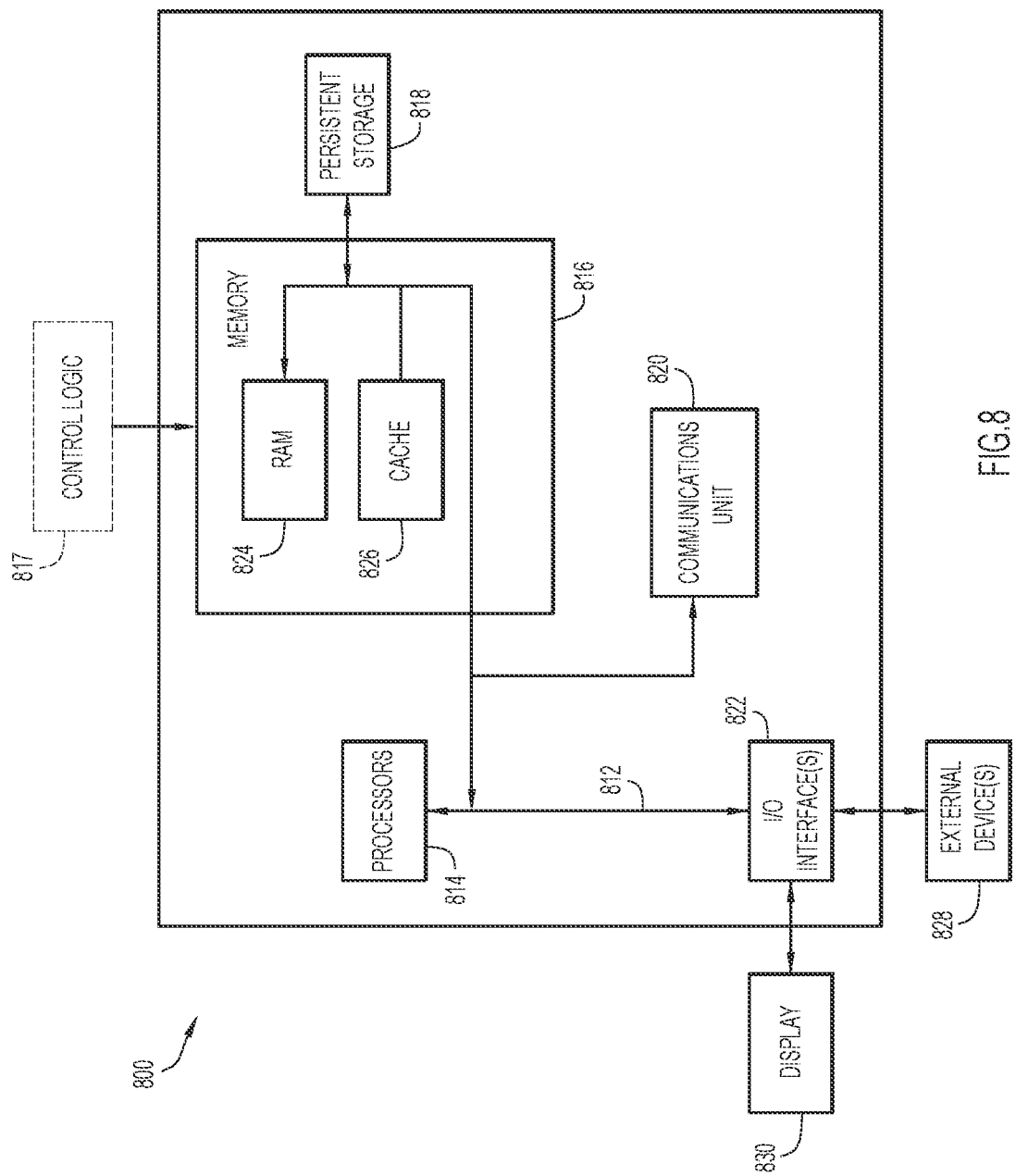
FIG. 8 is a block diagram of a computing device configured to perform the operations of a Producer or a Consumer presented herein, according to an example embodiment.

FIG. 8 illustrates a hardware block diagram of a computing device 800 that may perform functions of an hICN node operating either as a Consumer or a Producer (or both), as described above in connection with the operations depicted in FIGS. 1-6. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for the control logic 817 that controls and performs operations of the hICN node, may be stored in memory 816 or persistent storage 818 for execution by processor(s) 814. When the processor(s) 814 execute the control logic 817 for the hICN node, the processor(s) 814 are caused to perform the functions described above in connection with FIGS. 1-6.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To summarize, presented herein are mechanisms to establish a secure session between an hICN Consumer and Producer. The mechanisms provide content confidentiality by encrypting the payload of any data packet requested in a secure session as well as masking the name of the required content to the network in order to prevent an attacker who may have control of the network to infer what content a Consumer is requesting from the name. These mechanisms are much more generic that others heretofore known and can work with several application layer protocols.

In one form, a method is provided, comprising: at a Consumer seeking content from a Producer in a hybrid Information Centric Network: sending to the Producer a first Interest message having a payload that includes a ClientHello message compliant with Transport Layer Security (TLS) protocol, the first Interest message having a name indicating a handshake namespace and the ClientHello message including a list of one or more name mapping algorithms that the Consumer supports to map a public name associated with the content to a private name; receiving from the Producer a first Data message having a payload that includes a ServerHello message compliant with the TLS protocol, the ServerHello message including an indication of a selected name mapping algorithm selected by the Producer from the list of one or more name mapping algorithms included in the ClientHello message and a secure prefix associated with a secure namespace for the public name; computing the private name for the content using the selected name mapping algorithm, the secure prefix and a shared key established by the ClientHello message and the ServerHello message exchange between the Consumer and the Producer; sending to the Producer a second Interest message having a name indicating the private name for the content; and receiving from the Producer a second Data message that includes the content.

In another form, a method is provided comprising: at a Producer that is to provide content to a Consumer in a hybrid Information Centric Network: receiving from the Consumer a first Interest message having a payload that includes a ClientHello message compliant with Transport Layer Security (TLS) protocol, the first Interest message having a name indicating a handshake namespace and the ClientHello message including a list of one or more name mapping algorithms that the Consumer supports to map a public name associated with the content to a private name; selecting a name mapping algorithm from the list of one or more name mapping algorithms included in the first Interest message to provide a selected name mapping algorithm; sending to the Consumer a first Data message having a payload that includes a ServerHello message compliant with the TLS protocol, the ServerHello message including an indication of the selected name mapping algorithm selected by the Producer and a secure prefix associated with a secure namespace for the public name; receiving from the Consumer a second Interest message having a name indicating the private name for the content; and sending to the Consumer a second Data message that includes the content.

In still another form, an apparatus is provided comprising: a communication interface configured to enable network communications on behalf of a Consumer seeking content from a Producer in a hybrid Information Centric Network; a memory; and one or more processors coupled to the memory and the communication interface, wherein the one or more processors are configured to perform operations including: sending to the Producer a first Interest message having a payload that includes a ClientHello message compliant with Transport Layer Security (TLS) protocol, the first Interest message having a name indicating a handshake namespace and the ClientHello message including a list of one or more name mapping algorithms that the Consumer supports to map a public name associated with the content to a private name; receiving from the Producer a first Data message having a payload that includes a ServerHello message compliant with the TLS protocol, the ServerHello message including an indication of a selected name mapping algorithm selected by the Producer from the list of one or more name mapping algorithms included in the ClientHello message and a secure prefix associated with a secure namespace for the public name; computing the private name for the content using the selected name mapping algorithm, the secure prefix and a shared key established by the ClientHello message and the ServerHello message exchange between the Consumer and the Producer; sending to the Producer a second Interest message having a name indicating the private name for the content; and receiving from the Producer a second Data message that includes the content.

In yet another form, an apparatus is provided comprising: a communication interface configured to enable network communications on behalf of a Producer that is to provide content to a Consumer in a hybrid Information Centric Network; a memory; and one or more processors coupled to the memory and the communication interface, wherein the one or more processors are configured to perform operations including: receiving from the Consumer a first Interest message having a payload that includes a ClientHello message compliant with Transport Layer Security (TLS) protocol, the first Interest message having a name indicating a handshake namespace and the ClientHello message including a list of one or more name mapping algorithms that the Consumer supports to map a public name associated with the content to a private name; selecting a name mapping algorithm from the list of one or more name mapping algorithms included in the first Interest message to provide a selected name mapping algorithm; sending to the Consumer a first Data message having a payload that includes a ServerHello message compliant with the TLS protocol, the ServerHello message including an indication of the selected name mapping algorithm selected by the Producer and a secure prefix associated with a secure namespace for the public name; receiving from the Consumer a second Interest message having a name indicating the private name for the content; and sending to the Consumer a second Data message that includes the content.

In a further form, one or more non-transitory computer readable storage media are provided, encoded with instructions that, when executed by a processor, cause the processor to perform operations including: at a Consumer seeking content from a Producer in a hybrid Information Centric Network: sending to the Producer a first Interest message having a payload that includes a ClientHello message compliant with Transport Layer Security (TLS) protocol, the first Interest message having a name indicating a handshake namespace and the ClientHello message including a list of one or more name mapping algorithms that the Consumer supports to map a public name associated with the content to a private name; receiving from the Producer a first Data message having a payload that includes a ServerHello message compliant with the TLS protocol, the ServerHello message including an indication of a selected name mapping algorithm selected by the Producer from the list of one or more name mapping algorithms included in the ClientHello message and a secure prefix associated with a secure namespace for the public name; computing the private name for the content using the selected name mapping algorithm, the secure prefix and a shared key established by the ClientHello message and the ServerHello message exchange between the Consumer and the Producer; sending to the Producer a second Interest message having a name indicating the private name for the content; and receiving from the Producer a second Data message that includes the content.

In a further form, one or more non-transitory computer readable storage media are provided, encoded with instructions that, when executed by a processor, cause the processor to perform operations including: at a Producer that is to provide content to a Consumer in a hybrid Information Centric Network: receiving from the Consumer a first Interest message having a payload that includes a ClientHello message compliant with Transport Layer Security (TLS) protocol, the first Interest message having a name indicating a handshake namespace and the ClientHello message including a list of one or more name mapping algorithms that the Consumer supports to map a public name associated with the content to a private name; selecting a name mapping algorithm from the list of one or more name mapping algorithms included in the first Interest message to provide a selected name mapping algorithm; sending to the Consumer a first Data message having a payload that includes a ServerHello message compliant with the TLS protocol, the ServerHello message including an indication of the selected name mapping algorithm selected by the Producer and a secure prefix associated with a secure namespace for the public name; receiving from the Consumer a second Interest message having a name indicating the private name for the content; and sending to the Consumer a second Data message that includes the content.

In still another form, a system is provided comprising a Consumer and a Producer in a hybrid Information Centric Network, wherein the Consumer is configured to: send to the Producer a first Interest message having a payload that includes a ClientHello message compliant with Transport Layer Security (TLS) protocol, the first Interest message having a name indicating a handshake namespace and the ClientHello message including a list of one or more name mapping algorithms that the Consumer supports to map a public name associated with the content to a private name; the Producer is configured to: receive the first Interest message, select a name mapping algorithm from the list of one or more name mapping algorithms included in the first Interest message to provide a selected name mapping algorithm, and send to the Consumer a first Data message having a payload that includes a ServerHello message compliant with the TLS protocol, the ServerHello message including an indication of the selected name mapping algorithm selected by the Producer and a secure prefix associated with a secure namespace for the public name; wherein the Consumer is configured to: receive the first Data message, compute the private name for the content using the selected name mapping algorithm, the secure prefix and a shared key established by the ClientHello message and the ServerHello message exchange between the Consumer and the Producer, and send to the Producer a second Interest message having a name indicating the private name for the content; and wherein the Producer is configured to: receive the second Interest message and send to the Consumer a second Data message that includes the content.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a Consumer seeking first content from a Producer in a hybrid Information Centric Network:
        sending to the Producer a first Interest message having a first Interest message payload that includes a ClientHello message compliant with Transport Layer Security (TLS) protocol, the first Interest message having a first name indicating a handshake namespace and the ClientHello message including a list of one or more name mapping algorithms that the Consumer supports to map a public name associated with the first content to a private name;
        receiving from the Producer a first Data message having a first Data message payload that includes a ServerHello message compliant with the TLS protocol, the ServerHello message including an indication of a selected name mapping algorithm selected by the Producer from the list of one or more name mapping algorithms included in the ClientHello message and a secure prefix associated with a secure namespace for the public name;
        computing the private name for the first content using the selected name mapping algorithm, the secure prefix and a shared key established by the ClientHello message and the ServerHello message exchange between the Consumer and the Producer;
        sending to the Producer a second Interest message having a second name indicating the private name for the first content; and
        receiving from the Producer a second Data message that includes the first content.

2. The method of claim 1, wherein the list of one or more name mapping algorithms is included in an extension to the ClientHello message compliant with the TLS protocol, and the secure prefix and the selected name mapping algorithm are included in one or more encrypted extensions to the ServerHello message compliant with the TLS protocol.

3. The method of claim 2, wherein the list of one or more name mapping algorithms includes one or more encryption algorithms.

4. The method of claim 3, wherein the secure prefix is an Internet Protocol (IP) prefix that contains a number of IP addresses to map second content associated with a given public name.

5. The method of claim 4, wherein a mapping between public names and private names is achieved by assigning an IP address in the secure prefix to each of the public names, and wherein computing the private name comprises:
    excluding the secure prefix and applying the selected name mapping algorithm to a remaining part of the IP address; and
    reconstructing the IP address for the private name by prepending the secure prefix to a result of applying the selected name mapping algorithm to the remaining part of the IP address.

6. The method of claim 1, wherein the ClientHello message and the ServerHello message are part of a TLS handshake, and the second Interest message includes in a second Interest message payload an indication that the TLS handshake successfully completed.

7. The method of claim 1, wherein the ClientHello message and the ServerHello message are part of a TLS handshake, wherein the ClientHello message included in the first Interest message further includes a client certificate name for use by the Producer to retrieve a client certificate for the Consumer, and the ServerHello message included in the first Data message includes a random byte generated by the Producer,
    wherein the method further includes:
        receiving from the Producer a third Interest message having a third name that includes a certificate request context, wherein the certificate request context is the random byte generated by the Producer and encrypted using the shared key;
        comparing the random byte obtained from the certificate request context of the third Interest message received from the Producer with the random byte obtained from the ServerHello message to determine whether there is a match; and
        if the match is determined, sending to the Producer a second Data message that includes the client certificate for the Consumer and a second Data message payload that includes an indication that the TLS handshake successfully completed.

8. The method of claim 7, wherein the random byte in the ServerHello message is included in a Certificate Request element.

9. A method comprising:
at a Producer that is to provide first content to a Consumer in a hybrid Information Centric Network:
receiving from the Consumer a first Interest message having a first Instant message payload that includes a ClientHello message compliant with Transport Layer Security (TLS) protocol, the first Interest message having a first name indicating a handshake namespace and the ClientHello message including a list of one or more name mapping algorithms that the Consumer supports to map a public name associated with the first content to a private name;
selecting a name mapping algorithm from the list of one or more name mapping algorithms included in the first Interest message to provide the selected name mapping algorithm;
sending to the Consumer a first Data message having a first Data message payload that includes a ServerHello message compliant with the TLS protocol, the ServerHello message including an indication of the selected name mapping algorithm selected by the Producer and a secure prefix associated with a secure namespace for the public name;
receiving from the Consumer a second Interest message having a second name indicating the private name for the first content; and
sending to the Consumer a second Data message that includes the first content.

10. The method of claim 9, wherein the list of one or more name mapping algorithms is included in an extension to the ClientHello message compliant with the TLS protocol, and the secure prefix and the selected name mapping algorithm are included in one or more encrypted extensions to the ServerHello message compliant with the TLS protocol.

11. The method of claim 10, wherein the list of one or more name mapping algorithms includes one or more encryption algorithms, and wherein the secure prefix is an Internet Protocol (IP) prefix that contains a number of IP addresses to map the first content associated with a given public name.

12. The method of claim 11, wherein a mapping between public names and private names is achieved by assigning an IP address in the secure prefix to each of the public names, and wherein the private name is computed by excluding the secure prefix and applying the selected name mapping algorithm to a remaining part of the IP address; and reconstructing the IP address for the private name by prepending the secure prefix to a result of applying the selected name mapping algorithm.

13. The method of claim 9, wherein the ClientHello message and the ServerHello message are part of a TLS handshake, and the second Interest message includes in a second Interest message payload an indication that the TLS handshake successfully completed.

14. The method of claim 9, wherein the ClientHello message and the ServerHello message are part of a TLS handshake, wherein the ClientHello message included in the first Interest message further includes a client certificate name for use by the Producer to retrieve a client certificate for the Consumer, wherein the method further includes:
generating a random byte that is included in the ServerHello message of the first Data message;
sending to the Consumer a third Interest message having a third name that includes a certificate request context, wherein the certificate request context is the random byte generated by the Producer and encrypted using a shared key established between the Consumer and the Producer as part of the TLS handshake; and
receiving from the Consumer a third Data message that includes the client certificate for the Consumer and a third Data message payload that includes an indication that the TLS handshake successfully completely when the Consumer compares the random byte obtained from the certificate request context of the third Interest message received from the Producer with the random byte obtained from the ServerHello message and determines there is a match.

15. The method of claim 14, wherein the random byte is included in a CertificateRequest element of the ServerHello message of the first Data message.

16. An apparatus comprising:
a communication interface configured to enable network communications on behalf of a Consumer seeking first content from a Producer in a hybrid Information Centric Network;
a memory; and
one or more processors coupled to the memory and the communication interface, wherein the one or more processors are configured to perform operations including:
sending to the Producer a first Interest message having a first Interest message payload that includes a ClientHello message compliant with Transport Layer Security (TLS) protocol, the first Interest message having a first name indicating a handshake namespace and the ClientHello message including a list of one or more name mapping algorithms that the Consumer supports to map a public name associated with the first content to a private name;
receiving from the Producer a first Data message having a first Data message payload that includes a ServerHello message compliant with the TLS protocol, the ServerHello message including an indication of a selected name mapping algorithm selected by the Producer from the list of one or more name mapping algorithms included in the ClientHello message and a secure prefix associated with a secure namespace for the public name;
computing the private name for the first content using the selected name mapping algorithm, the secure prefix and a shared key established by the ClientHello message and the ServerHello message exchange between the Consumer and the Producer;
sending to the Producer a second Interest message having a second name indicating the private name for the first content; and
receiving from the Producer a second Data message that includes the first content.

17. The apparatus of claim 16, wherein:
the list of one or more name mapping algorithms is included in an extension to the ClientHello message compliant with the TLS protocol, and
the secure prefix and the selected name mapping algorithm are included in one or more encrypted extensions to the ServerHello message compliant with the TLS protocol;
the list of one or more name mapping algorithms includes one or more encryption algorithms; and
the secure prefix is an Internet Protocol (IP) prefix that contains a number of IP addresses to map second content associated with a given public name.

18. The apparatus of claim 17, wherein a mapping between public names and private names is achieved by assigning an IP address in the secure prefix to each of the public names, and wherein the one or more processors perform the computing the private name by:

excluding the secure prefix and applying the selected name mapping algorithm to a remaining part of the IP address; and reconstructing the IP address for the private name by prepending the secure prefix to a result of applying the selected name mapping algorithm to the remaining part of the IP address.

19. The apparatus of claim 16, wherein the ClientHello message and the ServerHello message are part of a TLS handshake, wherein the ClientHello message included in the first Interest message further includes a client certificate name for use by the Producer to retrieve a client certificate for the Consumer, and the ServerHello message included in the first Data message includes a random byte generated by the Producer, wherein the one or more processors are further configured perform the operations including:

receiving from the Producer an third Interest message having a third name that includes a certificate request context, wherein the certificate request context is the random byte generated by the Producer and encrypted using the shared key;

comparing the random byte obtained from the certificate request context of the third Interest message received from the Producer with the random byte obtained from the ServerHello message to determine whether there is a match; and if the match is determined, sending to the Producer a second Data message that includes a certificate for the Consumer and a second Data message payload that includes an indication that the TLS handshake successfully completed.

20. The apparatus of claim 19, wherein the random byte in the ServerHello message is included in a Certificate Request element.

\* \* \* \* \*